[11] 3,578,848

| [72] | Inventor | Robert R. Austin<br>Ridgefield, Conn. |
|---|---|---|
| [21] | Appl. No. | 700,928 |
| [22] | Filed | Jan. 26, 1968 |
| [45] | Patented | May 18, 1971 |
| [73] | Assignee | The Perkin-Elmer Corporation<br>Norwalk, Conn. |

[54] METHOD OF MAKING AN INTERFERENCE FILTER
1 Claim, 1 Drawing Fig.

[52] U.S. Cl. .................................................. 350/320,
117/33.3, 350/163
[51] Int. Cl. .................................................. G02b 00
[50] Field of Search .......................................... 350/163–
166; 117/33.3

[56] References Cited
UNITED STATES PATENTS

| 2,392,978 | 1/1946 | Dimmick .................. | 350/166X |
|---|---|---|---|
| 3,279,317 | 10/1966 | Ploke ......................... | 350/166X |
| 3,466,120 | 9/1969 | Herriott et al. ............ | 350/320 |

*Primary Examiner*—David Schonberg
*Assistant Examiner*—Toby H. Kusmer
*Attorney*—Edward R. Hyde, Jr.

ABSTRACT: A Fabry-Perot type interference filter in which the two reflectors are identical high reflection coatings and are separated by a spacer element made of solid glass. The coatings are formed on individual substrates which are optically contacted to the ends of the spacer. The coated ends of the substrates are optically contacted to the spacer element in sequence. After the first substrate is joined to the spacer element, the thickness of the spacer element is adjusted. Once the size of the spacer element is precisely that required, the other substrate is joined to it.

PATENTED MAY 18 1971
3,578,848
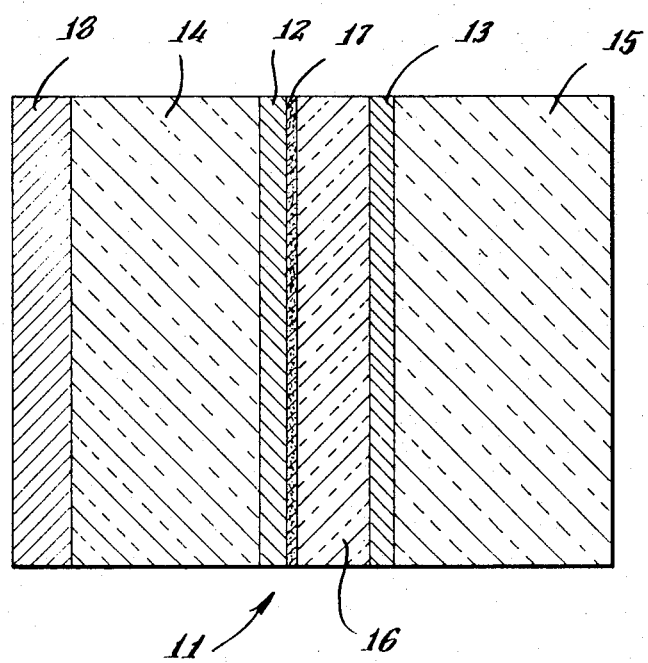
INVENTOR.
Robert R. Austin
BY Irving M. Kriegsman
ATTORNEY.

METHOD OF MAKING AN INTERFERENCE FILTER

This invention relates to optical filters. More particularly, this invention relates to the construction of interference-type optical filters.

Interference filters are now well known and widely used devices for passing certain spectral regions of light while at the same time rejecting other spectral regions of light. Although the term "interference filter" is somewhat imprecise in that several different types of filters are governed by interference phenomena, the term is generally used to describe the Fabry-Perot type interference filter which comprises essentially two spaced apart highly reflecting surfaces. The two surfaces may be single metallic films or multilayer systems of dielectric materials. When white light is passed through the filter and subsequently dispersed a banded spectrum is seen. By supplementary filter means well-known in the art it is possible to remove all but one of the plurality of transmission bands, if this be desired. The distance between the two reflecting surfaces determines the spacing and width of the transmission bands. This distance is in the order of several microns. As the distance is made larger, the transmission bands become closer and narrower. The spacing between the two reflecting systems determines the location in the spectrum of the transmission bands. Ideally the two reflecting systems should be identical. If the two systems are not exactly identical at the desired transmission wavelength, there will result some displacement of the transmission peak due to phase dispersion induced in the spacer medium. If the two reflecting systems are not substantially identical at the desired wavelength, the reflecting values at that wavelength will be different and the Airy conditions ($R_1 = R_2$) for peak transmission will not be satisfied. This results in a reduction in peak transmission of the passband.

Several different techniques are now known for constructing interference filters.

According to one technique, the two reflecting surfaces are formed on individual substrates which are separated by an air space and held at the desired distance by mechanical means such as O-rings or pins, etc. Although large separations i.e. 75 or 100 microns can theoretically be obtained, this arrangement is extremely difficult to initially align and then maintain in alignment.

In another technique, the two reflecting surfaces are formed on opposite sides of a thin sheet of mica. Although satisfactory for spacings of about 10 microns, the optical characteristics of mica preclude its usage when larger separations are desired. Additionally, it is extremely difficult to obtain a sheet of mica having good optical properties over any sizable surface area. Thus, mica is basically only useful for small sized filters in which the two reflecting surfaces are separated by about 10 microns.

In U.S. Pat. application Ser. No. 667,815, assigned to the assignee of this applications, there is disclosed an interference filter in which the two reflecting systems are evaporated onto the opposite ends of a solid glass spacer which is optically contacted to a supporting substrate.

Some of the published materials on interference filters are as follows:
1. U.S. Pat. No. 3,039,362,
2. U.S. Pat. No. 3,051,208,
3. Optical Properties of Thin Solid Films, O. S. Heavens, 1965, Dover Publications Inc., New York, Pages 227—231.
4. Physics of Thin Films, Volume 2, G. Hass and R. E. Thun, 1964, Academic Press.

It is an object of this invention to provide a new and improved interference filter and method of making the same.

It is another object of this invention to provide a new and improved narrow band interference filter and method of making the same.

It is still another object of this invention to provide an interference filter that is extremely rigid, is extremely insensitive to temperature changes, does not require the use of cement or mechanical supports to connect the different elements and is relatively inexpensive to manufacture.

It is yet still another object of this invention to provide an interference filter having a transmission bandwidth as small as about ½ A.

It is another object of this invention to provide an interference filter in which the two reflecting systems are essentially identical and are spaced apart at essentially the proper distance.

The above and other objects are achieved by constructing an interference filter according to this invention.

Briefly, the filter is made up of two identical high reflection coatings separated by a solid glass spacer. The coatings are formed on separate solid glass substrates which are optically contacted to the ends of the spacer.

The filter is constructed by first forming the two identical high reflection coatings on individual substrates. One end of the spacer is then optically contacted to the coated end of one of the substrates. The other end of the spacer is then machined and figured down to the exact required size (thickness). Once this size is obtained, this end of the spacer is optically contacted to the coated end of the other substrate.

One feature of the invention involves the technique of providing a spacer having the exact required size which includes machining the spacer to the approximate size, accurately determining what the length is and adding a correcting or tuning layer to one end of the spacer to produce the exact required size. Another feature of the invention involves the method of assembling the filter.

As can be seen, by means of this invention it is possible to provide an extremely rigid interference-type filter having two identical high reflection coatings spaced apart at any desired distance such as for example 100 microns.

Other features and many other attendant advantages of the invention will become apparent on reading the following detailed description when considered in connection with the accompanying drawings in which the sole FIG. is a section view greatly enlarged of a filter constructed according to this invention.

Referring now to the drawing, there is shown a filter designated by reference numeral 11.

The filter 11 includes two identical high reflection coatings 12 and 13. Coating 12 is formed on the rear end surface of a solid glass supporting substrate 14 and coating 13 is formed on the front end surface of a solid glass supporting substrate 15. Any glass may be used that is transparent to the light that is to be transmitted. For example, if the filter is to be used in the visible portion of the spectrum, the glass may be fused silica. On the other hand, if the glass is to be used in the infrared, a suitable glass is germanium. The front and rear ends of both substrates 14 and 15 are optically flat. Coatings 12 and 13 may be multilayer dielectric films. They are deposited on the substrates 14 and 15 by any of the well-known techniques such as thermal evaporation. A typical example of such a coating is a series of alternate layers of a high and low index material with each layer having an optical thickness of one-fourth of the design wavelength.

The filter 11 further includes a solid glass spacer element 16 positioned between the two coatings 12 and 13. The material used for the spacer element 16 maybe the same as that used for the two supporting substrates 14 and 15. The spacer element 16 is sized so as to produce the desired separation between the two high reflection coatings 14 and 15. The end surfaces of the spacer element 16 are optically flat and plane parallel. The front end of the spacer element 16 has an additional coating 17 of material whose index of refraction is the same as that of the spacer element. The purpose of the additional coating 17 will be explained below. The rear end of substrate 14, containing high reflection coating 12, is optically contacted to the front end of the spacer 16. The front end of substrate 15 containing high reflection coating 13 is optically contacted to the rear of spacer 16.

Finally, the filter 11 may include a supplementary coating 18 which may be a multilayer dielectric film formed on an uncoated end of one of the substrates i.e. the front end of substrate 14. The purpose of coating 18 is to remove unwanted sidebands so that only one band will be transmitted, if this be desired. Coating 18 is, of course, optional and is not to be considered part of this invention. Coating 18 may be deposited by any of the well-known techniques such as thermal evaporation.

The method of constructing the filter is as follows. First, three solid bodies of glass, hereinafter referred to as elements A, B and C, having the required index of refraction, cross-sectional area, and thickness sufficient to be used as the two substrates and spacer are polished down on their front and rear end surfaces and made optically flat. Identical high reflection coatings $R_1$ and $R_2$ are then formed on the front ends of elements A and B, the two elements which are to be used as the substrates. One way of forming identical coatings is by means of simultaneous evaporation, which comprises placing both elements in a single vacuum chamber and applying the coating simultaneously from a common source of evaporant. As an alternative technique, a single body of glass may be coated and then cut in half to form two bodies of glass. The coated end of element A is then optically contacted to the rear end of element C, the element which is to be used as the spacer. The front end of element C is then machined down so that its thickness is approximately equal to the separation required between the two high reflection coatings, $R_1$ and $R_2$, in order to transmit light over a particular wavelength band. A temporary layer of reflective material T that can be easily removed, such as for example, silver is then deposited onto the front end of element C. The coating of silver T together with the high reflection coating $R_1$ separated by a distance equal to the thickness of element C cooperate to form an interference filter. A spectral transmission chart is then made using a high resolution scanning spectrophotometer. Using data on the phase angle of the reflection vector for silver, the positions of transmission peaks can be predicted for a filter when the silver coating T is replaced with the high reflection coating $R_2$. Alternatively, a temporary coating of easily removable soft dielectric materials could be used in place of the silver coating T in which case the correction for the phase angle of the reflection vector would not be necessary.

Any error in the location of the transmission peak (the difference in where the peak actually occurs in the spectrum and where the peak is desired) may be corrected by adding the necessary amount of material M, having the same index as element C, to an end of element C so as to increase the thickness and hence the separation of the two reflecting systems. The formula for determining the amount of correcting material that must be added to element C so that it will be the proper thickness is:

$$\theta = \frac{(D_2 - W_3)}{(W_2 - W_1)}$$

where $W_1$ and $W_2$ are transmission peaks using the temporary silver coating, $W_3$ is the transmission peak using two identical multilayer dielectric high reflection coatings, $D_2$ is the desired wavelength, and $\theta$ equals some fraction of a half wavelength at a wavelength equal to $$\frac{W_2 + W_1}{2}.$$

Once the amount of material that should be added to element C to give it the desired thickness has been determined, the silver coating T is removed and the material M deposited on to the front end. The coated end of element B is then optically contacted to the front end of element C.

The following is an example of how a filter may be constructed, according to this invention, for transmitting light at a particular wavelength, such as for example 5890A. First three solid bodies of glass transparent to light at 5890A. and any conveniently available size are selected for use as the two substrates A', B' and the spacer C'. For example A', B', and C' may be solid bodies of fused silica ($n=1.45$) having a cross-sectional diameter of 6 inches and a thickness of 1½ inches. The end surfaces of elements A', B' and C' are polished down and made optically flat to one two-hundredth of a wavelength of green light. Elements A' and B' are then coated on their front ends with identical high reflection coating $R_1'$ and $R_2'$ which may consist of nine alternate quarter wavelength layers of thorium oxyfluoride ($n=1.45$) and zinc sulfide ($n=2.3$), the layer closest to the substrate being thorium oxyfluoride. The coated end of element A' is then optically contacted to the rear end of element C'. The front end of element C' is then machined down so that its thickness is approximately 80 microns and made optically flat and plane parallel to the high reflection coating $R_1$ connected to the other end. A coating of silver T', approximately 350A. thick, is then deposited onto the front end of element C'. The locations of the spectral transmission bands are then determined using a spectrophotometer. Assuming that two transmission bands occur at 5881A. and 5897A., it can be determined by calculations known in the art that if the silver coating T' were to be replaced with a dielectric coating $R_2^2$ identical to the dielectric coating $R_1^1$ at the other end there would be a peak transmission band at 5886A. The amount of material M that therefore must then be added to the spacer to give a separation that will produce a peak transmission band at 5890A. is then determined by using the formula:

$$\theta = \frac{D_2 - W_3}{W_2 - W_1}$$

where $\theta$ is some fraction of half wavelength. For the values of $D_2=5890$bA., $W_1=5881$A., $W_2=5897$A., and $W_3=5886$A., $\theta$ is one-fourth. Thus, the amount of material that should be added to the spacer is ⅛-wavelength optical thickness at 5889A. The silver coating T' is then removed from the front end of element C' and a ⅛-wavelength coating of silicon dioxide D' deposited on to the front end of element C'. The coated end of the element B' is then optically contacted to the front end of element C'. Finally, a supplementary coating U to remove unwanted sidebands is deposited onto the uncoated end of element A'. This coating may comprise a multilayer coating of dielectric materials represented by the formula $[(HL)^3H\,^{10}(LH)^3L]^2$, where H is a layer of high index material such as zinc sulfide ($n=2.3$) having an optical thickness of $\lambda/4$, L is a layer of low index material such as crylolite ($n=1.35$) having an optical thickness of $\lambda/4$ and $\lambda$ is the design wavelength (5890A.).

Obviously, many modifications and variations of the present invention are possible in light of the above teachings. It is therefore to be understood that within the scope of the appended claims, the invention may be practiced otherwise than as specifically described.

I claim:
1. A method of making an interference filter comprising:
   a. providing three solid bodies of glass having optically flat and plane parallel ends,
   b. forming identical high reflection coatings on the front ends of two of the solid bodies of glass,
   c. connecting the coated front end of one of the two solid bodies of glass to the rear end of the third solid body of glass by optical contacting,
   d. changing the thickness of the third solid body of glass by machining its front end until its thickness is approximately the required size,
   e. adding a temporary reflective coating on said front end of the third solid body and testing the filter so formed to determine the amount by which the thickness of said third solid body must be changed to produce the required separation for high reflective coatings at each end thereof to transmit light over a preselected wavelength,
   f. removing the temporary reflective coating,
   g. changing the thickness of the third solid body of glass as required to increase it by adding to its front end a coating of material having the same index of refraction as the third body,
   h. changing the thickness of the third solid body of glass as required to reduce it by machining its front end, and
   i. then connecting the coated front end of the other of the two solid bodies to the front end of the third solid body of glass by optical contacting.